UNITED STATES PATENT OFFICE.

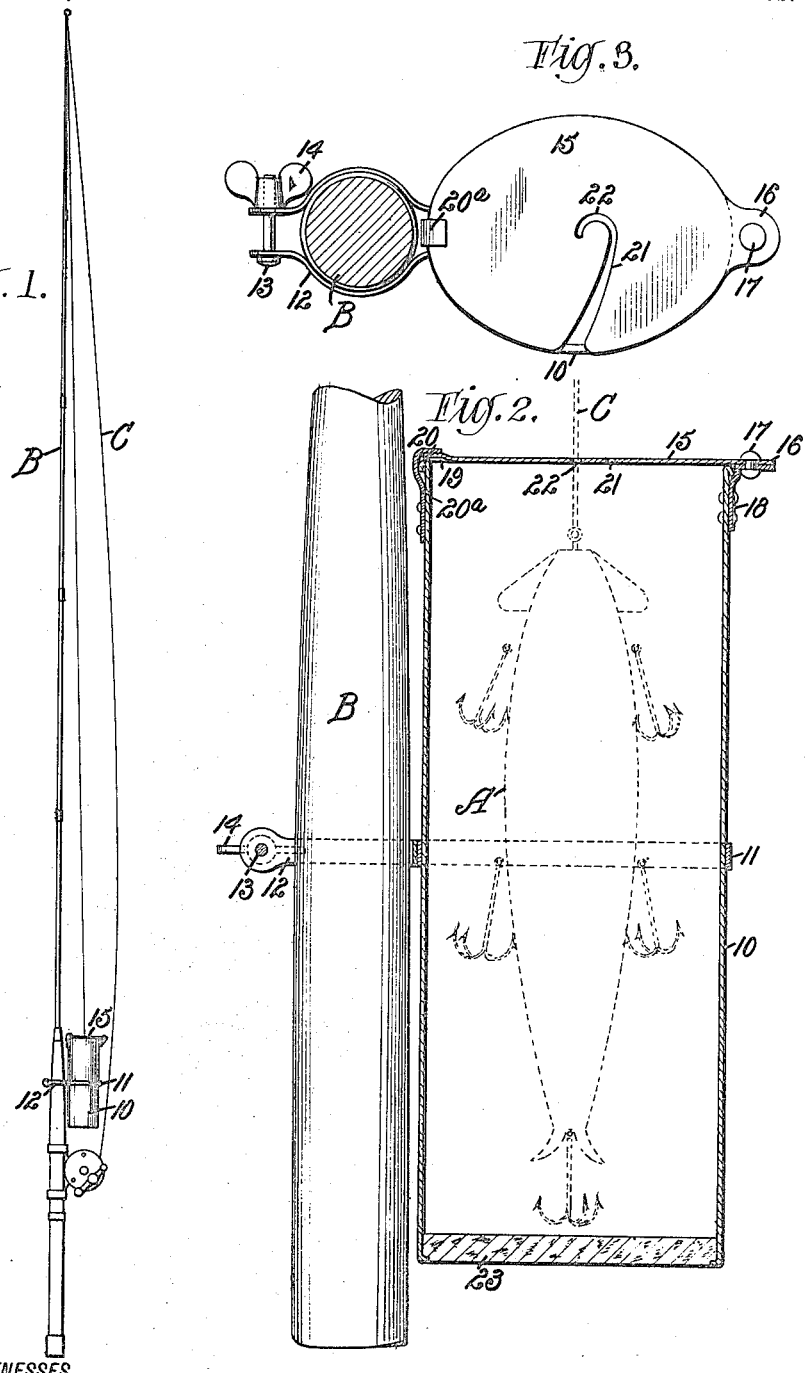

HORACE DAVID CAMMACK, OF CROSSETT, ARKANSAS, ASSIGNOR OF ONE-HALF TO FRANK S. CANNON, OF CROSSETT, ARKANSAS.

MINNOW-HOLDER.

1,216,069.  
Specification of Letters Patent.  
Patented Feb. 13, 1917.

Application filed June 7, 1916. Serial No. 102,182.

*To all whom it may concern:*

Be it known that I, HORACE DAVID CAMMACK, a citizen of the United States, and a resident of Crossett, in the county of Ashley and State of Arkansas, have invented a new and Improved Minnow-Holder, of which the following is a full, clear, and exact description.

My invention relates to a holder for bait hooks and artificial minnows which are equipped with bait hooks.

Objects of the invention are to provide a holder that may be readily attached to a fishing pole or rod to house the minnow or bait hooks for conveniently carrying the same without danger of the hooks catching in the person or clothing of the fisherman or foreign bodies; and to provide a minnow holder which, when attached to the pole, will permit of a minnow on the end of a fishing line being conveniently placed in or removed from the holder, the cover of the latter having provision for the lateral entrance and removal of the fish line.

A further object of the invention is to provide a holder capable of use for the carrying of the minnow or hooks in the pocket, whereby extra minnows or hooks may be carried or the single minnow carried in the pocket when detached from the line.

The invention will be particularly explained in the specific description following.

Reference is to be had to the accompanying drawings forming a part of this specification in which similar reference characters indicate corresponding parts in all the views.

Figure 1 is a side elevation of a holder embodying my invention, showing the same in use on a fishing rod for housing a minnow on the end of a fishing line;

Fig. 2 is a central vertical section of the minnow holder on an enlarged scale, a portion of the fishing rod being shown in elevation;

Fig. 3 is a plan view.

My improved holder comprises a container 10, preferably cylindrical and having dimensions to accommodate an artificial minnow or minnows, or hooks, one minnow being indicated in dotted lines at A in Fig. 2. The container, when used on a fishing rod, is encircled, at its approximate center, by a band 11 fixedly secured thereto in any suitable manner as by soldering or the like, and to said band, at one side, is secured a clamp comprising resilient arms 12 oppositely curved to embrace the butt of a fishing rod B. The free ends of the clamp arms are brought approximately parallel and receive a transverse bolt 13, having a wing nut 14 or the like, for tightening the clamp on the rod, or permitting its ready detachment.

The upper open end of the container 10 is adapted to be closed by a cover 15 which has at one end an ear 16 secured by a rivet 17, or the like, to a bracket 18 on the container body 10, the arrangement being such that the said cover may be swung laterally in its own plane to a position closing the container, or to a position at a side of the container.

At the opposite end of the cover 15 from the pivot, said cover is pressed upwardly as at 19 to produce a recess at the under side of the cover, said recess being adapted to receive a protuberance 20 on the adjacent upper edge of the container 10 so that the cover may be snapped into engagement with the said protuberance to hold the cover in the closed position. In addition, a catch 20ª is provided on the container particularly when employing the clamp for attachment of the container to a rod, said catch being resilient and having a laterally bent member overhanging the top of the container to accommodate the adjacent edge of the cover with the recessed part 19. The additional catch positively prevents the cover from being forced open by an accidental lateral pull exerted on the line due to the hooks or line catching on some object.

In order to accommodate a fish line C carrying the minnow A or hooks and permit the latter to be entered in the container and held therein without the line interfering with the cover, said cover is provided with a lateral slot 21 extending from a side edge of the cover, said slot being flaring at its outer end for the ready entrance of the line C laterally. The slot 21 is returned on curved lines at 22 at its inner end as best seen in Fig. 3, so that when the cover is swung to the open position, the minnow may be dropped into the container 10 and the line then entered laterally in the slot 21 and returned at the curved end 22 to a position to insure the holding of the line in engagement with the cover while freely passing therethrough. The cover may now be swung to the closed position and will carry the line with it. Thus, the arrangement permits of manipulating the fish line and the cover in housing and removing the minnow or hooks without any danger of the gang hooks catching in the hands or clothing of the fisherman.

The bottom 23 of the container is made of cork or otherwise made buoyant to insure that the container will float in the event it is accidentally dropped into the water.

When detached from the fishing rod, the container can be conveniently carried in the pocket or an extra container may be employed for carrying extra minnows.

Having thus described my invention, I claim as new and desire to secure by Letters Patent:

1. As a new article of manufacture, a bait holder comprising an elongated cylindrical container provided with means for securing it to a fishing rod, said container having an open upper end and provided with a cover for said end, said cover being in the form of a disk pivoted to swing horizontally and having a slot extending out through its edge, the outer end of the slot being flared and the inner end curved outwardly in the direction of the side through which it extends, and terminating approximately at the center of the cover, and fastening means for the cover.

2. As a new article of manufacture, a bait holder comprising an elongated cylindrical container having a cork bottom and provided with a cover in the form of a disk and pivoted to swing horizontally and having a slot extending out through its edge, the outer end of the slot being flared and the inner end curved outwardly in the direction of the side through which it extends, and terminating approximately at the center of the cover, the container being provided with means for securing it to a fishing rod and with means for locking the cover closed.

HORACE DAVID CAMMACK.